March 18, 1930. J. F. RULE 1,750,966
AUTOMATIC TEMPERATURE CONTROL FOR GLASS
Filed June 7, 1926 3 Sheets-Sheet 1
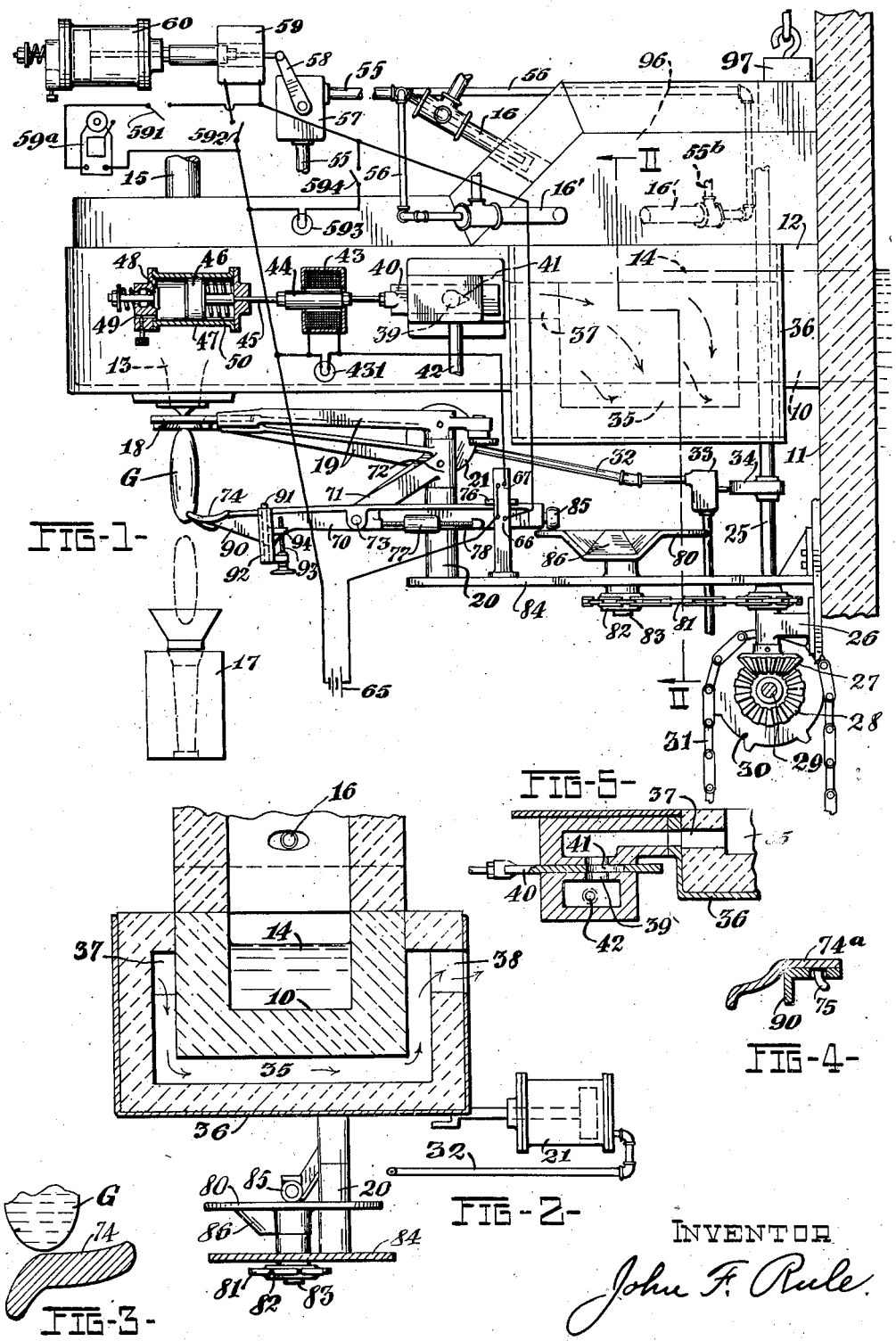

March 18, 1930. J. F. RULE 1,750,966
AUTOMATIC TEMPERATURE CONTROL FOR GLASS
Filed June 7, 1926  3 Sheets-Sheet 2
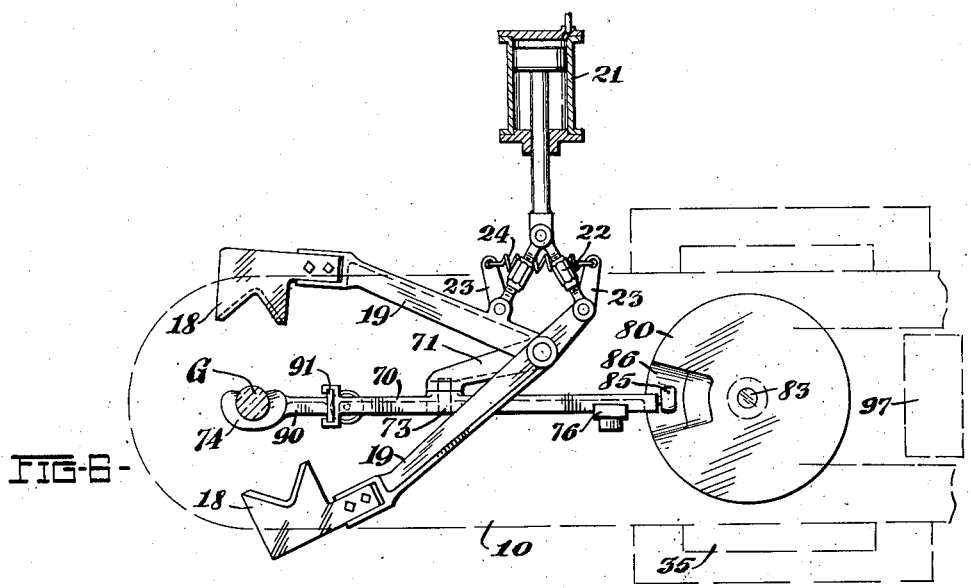
FIG-6-
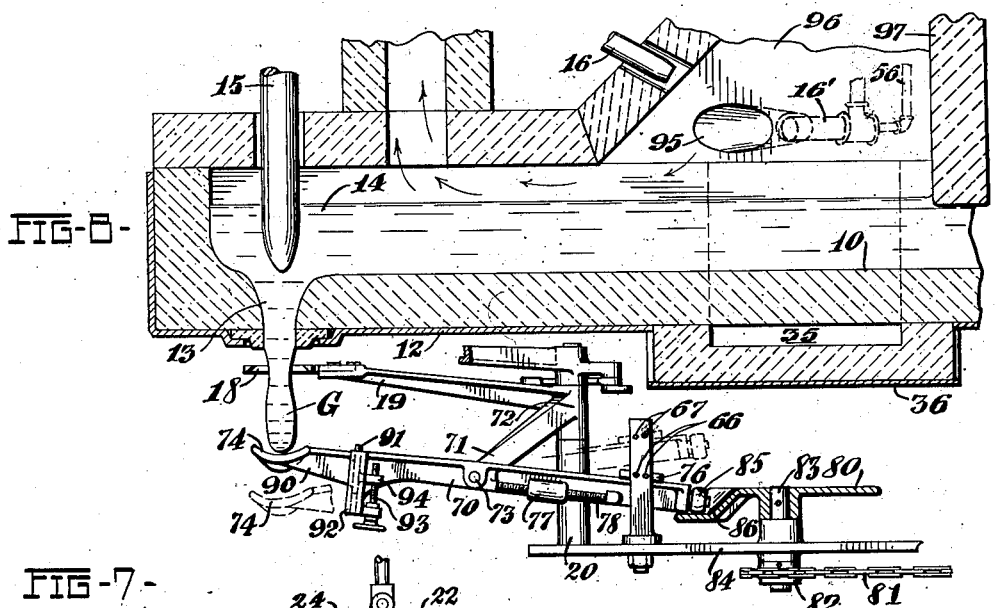
FIG-8-
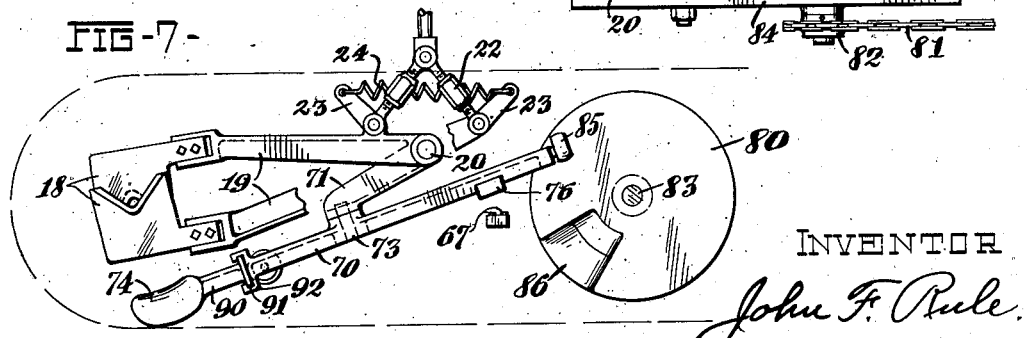
FIG-7-
INVENTOR
John F. Rule.

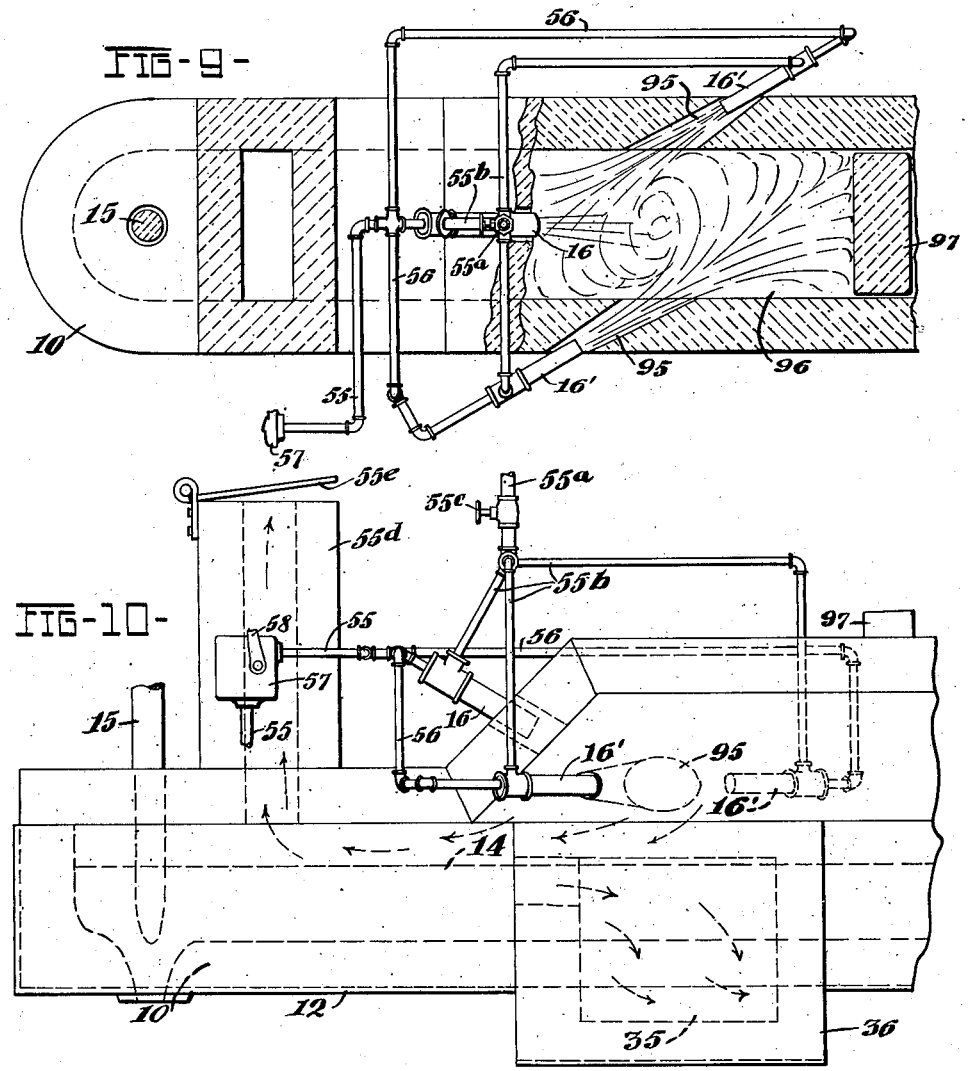

Patented Mar. 18, 1930

1,750,966

UNITED STATES PATENT OFFICE

JOHN F. RULE, OF TOLEDO, OHIO, ASSIGNOR TO OWENS-ILLINOIS GLASS COMPANY, OF TOLEDO, OHIO, A CORPORATION OF OHIO

AUTOMATIC TEMPERATURE CONTROL FOR GLASS

Application filed June 7, 1926. Serial No. 114,042.

My invention relates to means for automatically regulating and controlling the temperature of a body or supply of molten glass. The invention is particularly adapted for use in connection with automatic glass feeders for supplying individual masses or charges of glass to the molds of forming machines, and provides means for maintaining the glass at a substantially uniform normal working temperature.

An object of the invention is to provide automatic means for regulating and controlling the size or weight of the individual charges of glass and maintaining the weight of the charges substantially uniform.

In supplying charges of glass to forming molds, it is necessary to maintain the temperature of the glass substantially uniform. Any variations in temperature above or below a predetermined normal working temperature, cause substantial variations in the viscosity or fluidity of the glass with corresponding variations in the condition of ware formed from such charges. Moreover, in automatic glass feeding mechanism, wherein the glass issues from an outlet in a container and the issuance of glass is ordinarily controlled by a periodically actuated controlling device such as a reciprocating plunger, or by some other controlling means,—any variations in the temperature of the glass cause a material change in the rate of flow. Where the issuing glass is suspended from the walls of the outlet, thereby producing preformed charges, the temperature changes produce considerable variations in the shape and length of the suspended charges. For example, any rise in temperature of the issuing glass, with consequent increased fluidity, will increase the length of the suspended charge owing not only to the more rapid rate of flow, but also on account of the more fluid condition of the glass the suspended charge will be more elongated, so that the length of such suspended charge will increase more rapidly than the rate of flow.

In the practical operation of a feeder of the character indicated, temperature changes are frequent owing to varying conditions in the main furnace, and other factors, so that it has been found necessary for the operator to maintain a close watch on the condition of the feeder and to make frequent adjustments for the purpose of maintaining the temperature of the glass and size and shape of the charges of glass as nearly normal as possible. The extent of such adjustments is largely a matter of guess-work and, further, such adjustments often are not made until the temperature of the glass is considerably above or below a desirable working temperature, so that it is difficult or impossible to maintain the uniform temperature conditions that are desirable where the necessary adjustments or regulations depend upon the skill of the operator.

An object of the present invention is to overcome these difficulties and objections by the provision of automatic controlling means governed by the condition of the issuing glass. The variations in the length, weight and shape of the suspended charges of glass resulting from small changes in temperature above or below normal,—are utilized in the present invention for actuating controlling means by which the desired uniform temperature and consequent uniformity in the size and condition of the charges is automatically maintained.

A temperature regulating medium such as a heating flame for increasing the temperature, or an air circulating system for lowering the temperature, may be employed and controlled by means actuated electrically or otherwise. Such means may be under the influence and control of a mechanical controlling device such as an arm or lever arranged in the path of the issuing glass and actuated thereby under abnormal temperature conditions.

A feature of the invention relates to the provision of a controlling device of the character indicated which will remain inactive so long as the temperature of the glass remains normal or within predetermined operative limits, such controlling device being brought into activity only when the temperature becomes abnormal, with a consequent change in position, size or shape of the issuing charge of glass.

A further feature of the invention consists in providing a controlling device of the character indicated which shall only remain in contact with the glass for a very short time, thereby preventing objectionable chilling of the glass.

A further object of the invention is to provide a controlling device of the nature indicated, which is responsive to very slight changes in the length or weight of suspended charges, thereby maintaining a close regulation of the temperature and a consequent uniformity in the size and condition of the charges, resulting in uniformity in the finished ware.

A further object of the invention is to provide automatic signaling or indicating means by which the operator may be notified as to any abnormal changes in temperature and which will indicate at all times the temperature conditions of the glass in the feeder.

In the accompanying drawings forming a part of this application and illustrating one form of mechanism for effecting the control above outlined:

Fig. 1 is a side elevation with parts in section, showing the completely assembled control mechanism and a diagrammatic illustration of the electrical circuits;

Fig. 2 is a vertical transverse sectional view taken substantially on the line II—II of Fig. 1, certain portions being eliminated for the sake of clarity;

Fig. 3 is a cross sectional view of the charge engaging portion of the control arm;

Fig. 4 is a view similar to Fig. 3, but shows a modification in which the charge engaging portion is readily replaceable;

Fig. 5 is a detail sectional view of the valve controlling the inlet to the channel across the boot;

Fig. 6 is a plan view, partially in section, showing the relation of the control bar or arm and the charge severing means, the cutters being in open position permitting formation of a suspended charge and functioning of the control arm;

Fig. 7 is a view similar to Fig. 6, but shows the cutters in charge severing relation and the control bar shifted laterally from the delivery path of formed charges;

Fig. 8 is a vertical central longitudinal section with parts in elevation, showing the relation of the feeder boot, cutters, and control device;

Fig. 9 is a plan view, partially in section, showing the burner arrangement whereby application of heat to the entire surface of glass in the feeder boot is assured;

Fig. 10 is a side elevation of those portions shown in Fig. 9.

In the accompanying drawings, the invention is illustrated in connection with a conventional form of feeder boot 10 projecting outwardly from a furnace wall 11 and supported in a casing 12. A submerged discharge orifice or outlet 13 is formed in the floor of the boot to permit periodic discharge of glass from the supply body of glass 14, such periodic discharge being controlled by a reciprocating plunger 15 projecting through an opening in the ceiling of the boot and into the body of glass in register with said discharge orifice 13. For the purpose of maintaining a substantially normal temperature within the boot 10, a burner 16 is projected through an opening in the boot cover as is customary, and shown in Figs. 1 and 8. For illustrative purposes, a blank mold 17 is shown below and in register with the discharge orifice 13, it being understood that this mold is one of a series ordinarily carried by a traveling mold carriage and adapted to successively assume the position shown and receive charges of glass fed by gravity from the feeder boot 10.

The formed suspended charges are periodically severed by a pair of cutters 18 having arms 19 oscillating around a common center and mounted upon the upper end of a vertical supporting post 20 rising from a platform 84. These cutters and arms may be and preferably are of customary form, and actuated periodically in timed relation with the regulating plunger movements by a piston motor 21 to which connection is effected by means of toggle links 22 or the like devices. Laterally projecting fingers 23 are carried by the inner ends of the cutter arms 19 and interconnected by means of a coil pull spring 24 whose function is to normally and yieldably hold the cutters in spaced inoperative relation as shown in Fig. 6.

Periodic admission of air to the cylinder of the piston motor 21 and consequent actuation of the charge severing means is accomplished by interposing in the air feed line 32, a valve 33 which is actuated by a cam 34 fixed to a vertical shaft 25, said shaft being the usual continuously rotating shaft employed to cause reciprocation of the glass flow control plunger 15. As will be noted in Fig. 1, the lower end of the shaft 25 is journalled in a bearing 26 adjacent and immediately below the platform 84 and carries a bevel gear 27 running in mesh with a second bevel gear 28 mounted upon a horizontal shaft 29 which receives its rotary motion from any ordinary or preferred source through a sprocket wheel 30 and sprocket chain 31.

In controlling the length and weight of formed charges of glass by changing the temperature of glass within the feeder boot 10, it is necessary to either reduce or increase the temperature and desirable that the change be effected as rapidly as possible so that there will be a minimum lapse of time between the departure from, and return to delivery, of normal charges of glass. In the present case, for the purpose of causing a reduction in the temperature of glass in the boot 10, a substantially U-shaped channel or passageway 35 is shown arranged adjacent the juncture of the feeder boot and the furnace 11, the outer surfaces of the boot floor and adjacent portions of the vertical sides forming the inner wall of the passageway 35, as will be noted in Fig. 2. Obviously, the channel may be formed in the brick forming the walls and floor of the boot if preferred. While this channel is shown adjacent the furnace wall, it is obvious that varying conditions may necessitate placement at a point spaced further from the wall. Fire-brick forming the outer wall of this passageway may be supported by a casting 36 in any preferred manner. Preferably, and for the purpose of obtaining uniform distribution of cool air or other cooling medium or perhaps a heating medium throughout the passageway 35, the inlet 37 is formed at the upper end of one vertical branch of the passageway while the outlet 38 is formed at the upper end of the other branch and preferably, though not necessarily, opens through the casting 36 to the atmosphere.

By arranging the inlet 37 as shown in Fig. 1 and above set forth, the incoming air or other medium is uniformly distributed throughout the channel, thereby contacting with the entire outer surface of the boot which in this instance forms one wall of said channel. It is obvious that movement of a continuous stream of cold air or other cooling medium through this transverse channel 35, will necessarily chill the adjacent portions of the feeder boot and result in a reduction of the temperature of the glass as it passes over this cooled portion, such reduction changing the fluent condition of the glass and permitting resumption of a normal rate of flow and issue as heretofore outlined.

Periodic admission of a cooling medium (or perhaps a heating medium) to the transverse passageway 35 is attained by providing a valve having a valve opening 39 which is normally closed by means of a slidable valve plate 40 formed with a longitudinally elongated opening 41 which is from time to time brought into register with the inlet opening 39. A channel at one side of the valve opening 39 communicates with the aforementioned inlet 37 formed in the transverse passageway, while a chamber at the opposite side of the valve opening 39 has direct communication with an inlet pipe 42 through which air passes from any suitable source.

While other means may be employed to move the valve plate 40 as circumstances may require, an electric device in the form of a solenoid 43 is employed, in this instance, the core 44 having one end rigidly connected to the adjacent end of the valve plate 40 while its other end is provided with a short rod 45 effecting rigid connection to the piston 46 of a dash-pot 47. This rod 45 is formed with a shoulder engaging an end of the dash-pot cylinder at times, thereby limiting movement of the piston in the cylinder. As will be noted in Fig. 1, this dash-pot 47 comprises a cylinder having an air inlet valve 48, and a needle valve controlled bleed opening 49, by means of which valves, a full charge of air may be quickly drawn into the cylinder and then slowly discharged through the bleed opening, such discharge being effected by movement of the piston 46 under influence of a coil expansion spring 50. Thus, it is evident that with movement of the solenoid core 44 to the position shown in Fig. 1, the valve plate 40 will be moved to bring the opening 41 into register with the inlet opening 39, and because of the dash-pot apparatus, return of the valve plate 40 to a valve closing position when the solenoid is deenergized, will require a greater period of time than if merely a solenoid were used. The result is, that before the inlet 39 is closed, and where cooling is desired, a considerable and effective quantity of cold air or other cooling medium will have been injected into the transverse passageway 35 to cool a transverse portion of the boot and vary the glass temperature. Means for energizing the solenoid 43 will be set forth hereinafter.

As has been previously stated, where the condition of the glass within the feeder boot is such that a temperature increase is essential to the formation of the charges of proper length and weight, provision is made for such temperature increase as may be required by the particular state of the glass. To this end, the burners 16 and side burners 16', which under normal operating conditions receive a constant gas supply from any suitable source through a supply pipe 55, are provided with interconnected auxiliary gas supply pipes 56 having a common flow control valve 57 which carries an operating lever 58.

The arrangement of the burners 16 and 16', as shown in Figs. 8 and 9 wherein the two side burners 16' project obliquely into openings 95 formed in the vertical side walls of a substantially closed heating chamber 96, assures uniform application of heat to the entire surface of the glass within said chamber. It will be noted by reference to Fig. 9 that these burners 16 and 16' receive their supply of gas through a single pipe 55 as above stated. Because of the oblique arrangement of the side burners 16', the flames injected into the heating chamber 96 are directed to and deflected from diagonally opposed portions of the walls and as shown in Fig. 9 the heat waves follow a substantially elliptical path. The third or forward and ordinary burner 16 is intended to direct a separate flame into the heating chamber from a point above the other two burners 16', and is projected substantially into the center of the heating chamber. It is evident that periodic increase in the volume of gas supplied to the burners will effect a proportionate increase in the temperature and fluidity of the glass flowing to the discharge outlet.

Formation of a separate heating chamber 96 in the boot is attained by the arrangement of a vertically adjustable valve gate 97 which may be so positioned that it will shut off the space above the glass in the feeder boot from the space above the glass in the refining tank. Such a separation of these spaces, forms in effect a separate heating chamber in the feeder boot and allows a rapid increase in the temperature and fluidity of the glass within said chamber by means of the aforementioned burners 16 and 16'.

Although the entire supply of fuel gas to the burners 16 and 16' may be directed through the pipe 55 and under the control of the valve 57, I have shown an additional supply pipe system (Figs. 9 and 10) by which a portion of the fuel gas may be conducted to the burners independently of the valve 57. This auxiliary system comprises a supply pipe 55ª and distributing pipes 55ᵇ leading to the burners. A hand valve 55ᶜ controls the amount of gas admitted through this auxiliary system. This hand valve may be adjusted so that the burners will supply continuously an amount of heat required to maintain the glass at approximately a normal temperature under ordinary conditions, thereby cooperating with the automatic control devices, reducing the burden placed on the latter and assisting in maintaining a uniform normal temperature of the glass.

The spent gases of combustion are conveyed upward through a stack 55ᵈ provided with a damper 55ᵉ which may be adjusted by any suitable means to control the draft, thereby serving as an additional means of heat control.

Means for actuating the valve operating lever 58 and consequently opening the valve 57 to admit an additional volume of gas to the burners 16 and 16', in this instance, includes a solenoid 59 and dash-pot 60 of forms identical to those employed for actuating the valve plate 40. Thus, it is evident that with energization of the solenoid 59, the valve 57 will be opened to permit supply of an additional volume of gas to the burners 16 and 16' and consequently cause a rise in the temperature of and a change in the fluidity of the glass in the feeder boot. While the valve 57 has been described as controlling the supply of gas, it is quite obvious that this same valve could be readily arranged to vary the quantity of air being mixed with the gas and thereby vary the effectiveness of the burners.

As will be noted by reference to Fig. 1, these solenoids 43 and 59 are adapted to be energized by electric current received from a common source which may be in the form of a storage battery 65. Interposed in the circuits are vertically spaced pairs of switch contacts 66 and 67, the first named pair being disposed in the circuit for energizing the solenoid 59 which actuates the valve for increasing the heat, while the latter pair of contacts 67 is arranged in the circuit which allows energization of the solenoid 43 and consequent admission of a cooling medium to the transverse channel 35.

In order that the length and weight of suspended charges or perhaps the weight of the completely formed portion may cause closing of one of these circuits and a consequent increase or decrease of the temperature of the molten glass as circumstances may require, a main control bar or arm 70 is provided. This bar is pivoted substantially at its center to a rigid arm 71 extending forwardly and downwardly from a bearing sleeve 72 which incidentally is integrally formed with one of the cutter arms 19. This construction, as is evident, permits vertical swinging of the control arm 70 about the pivot or fulcrum 73 and at the same time assures positive lateral movement of the control arm simultaneously with advance of the cutters to a charge severing position, thereby clearing the path of travel of the charges to the molds 17. The control bar 70 carries at its forward end a vertically adjustable section 90, normally disposed in the path of travel of several charges and shaped to form a contact piece 74 for temporarily engaging the formed suspended charges, one side edge of the contact piece being curved downwardly to provide a surface over which the charges of glass may move without being distorted. It will be noted in the assembled views that the contact piece or lip 74 is shown as being integral with the section 90, but it is to be understood that this portion may well and perhaps advantageously be a separate contact piece 74ª (Fig. 4) and readily replaceable, such replacement being desirable because of the wear resulting from subjection to intense heat of the charges. The lip 74ª is provided with a lug 75 projecting through an opening in the control, though obviously other means may be employed to effect this separable connection. The contact piece 74ª may be made of asbestos, fire clay or other nonconducting material.

A single forming machine and feeder associated therewith are frequently used in the production of different types and sizes of ware, such varied use being possible by changing the molds and making minor adjustments. Obviously, due to the permanent association of the charge weight control mechanism with the feeder, it is essential that means be provided whereby such apparatus may be employed to maintain uniformity of the suspended charges regardless of the type or size of ware being produced. To this end, the main control bar is provided with a vertically adjustable outer end portion 90 having a head 91 slidable in vertical guides 92 formed on the adjacent end of said control bar. Vertical adjustment is attained by means of an adjusting screw 93 extending through a nut 94 fixed to the head 91 of said arm 90. It is evident that with this structure, the mechanism may be readily adjusted to control the length and weight of charges whose normal length varies in accordance with the ware being produced. This separable connection between the charge engaging portion and the control bar also allows ready replacement, which may be found necessary from time to time as previously stated.

The inner end portion of the control bar 70 is provided with a contact piece 76 of sufficient length to interconnect either pair of contacts 66 or 67. While the charges being formed are of normal length and weight, this contact 76 is disposed in a neutral or intermediate position (Fig. 1) centrally between said pairs of contacts. The weight of the control bar 70 is so distributed with reference to the fulcrum point 73 that the rear end slightly overbalances the front end. In order that this overbalanced condition may be positively assured and accurately adjusted, a weight 77 is mounted upon a longitudinal threaded rod 78 carried by the control bar 70, and is adjustable lengthwise of the rod.

The upward tilting movement of the forward end of the control bar 70 is limited and controlled by a disk 80 which runs beneath and in contact with a roll 85 mounted on the rear end of the control bar. The disk 80 is mounted on a stub shaft 83 having a bearing in the platform 84 and is rotated continuously by means of a sprocket chain 81 which is trained over a sprocket wheel 82 keyed to the shaft 83. The chain 81 is driven from the shaft 25, the parts being so proportioned that the disk 80 is given one complete rotation during each cycle of operations of the feeder. The disk 80 is formed with a depression 86 which is brought beneath the roll 85 just prior to the cutting operation of the shears, thereby permitting the control bar 70 to tilt to the Figure 8 position under certain conditions, as hereinafter set forth.

The operation of the temperature controlling mechanism may be described as follows:

Assuming the feeder to be in operation with the glass at a normal temperature, the control lever 70 will be held in its normal horizontal position (Fig. 1) by engagement of the roll 85 with the flat portion of the rotating disk 80. This position is maintained until the depression 86 is brought beneath the roll 85 just prior to the cutting stroke of the shears. During this rotation of the disk 80, the issuing glass is forming a suspended gob or charge G and by the time the depression 86 is beneath the roll 85, this gob has elongated downward to such an extent that the lower end thereof is in close proximity to or in contact with the contact plate 74 of the control lever 70. The suspended gob, therefore, controls the position of said lever and if of normal form, permits but little, if any, tilting movement of the lever when the roll 85 is over the depression 86. The piston motor 21 now operates the shears to sever the suspended gob. The cutting stroke of the lower shear blade operates as heretofore described to swing the control lever 70 laterally out of the path of the gob G prior to its severance, allowing the gob to drop into the mold therebeneath. The opening movement of the shear arms resets the control lever 70 which is again engaged and held in its horizontal position by the disk 80.

If the temperature of the glass in the boot falls below normal, it will immediately result in a more sluggish flow of the glass at the discharge outlet and a reduction in the length of the suspended gobs. As a result, the lower end of the gob will not have reached a position to prevent the upward tilting of the control lever when the depression 86 of the disk is beneath the roll 85. Said lever will, therefore, be tilted to the Figure 8 full line position, thereby causing the contact bar 76 to span the contacts 66 and close the circuit for the solenoid 59 and consequently energize said solenoid, causing the latter to open the valve 57 and increase the heat supplied to the boot, as heretofore set forth. Immediately following the closing of this circuit, the cutters operate to sever the charge and swing the control bar laterally. This lateral movement withdraws the contact piece 76 from the contacts 66 and de-energizes the solenoid 59. A quick return of the solenoid core is prevented by the dash-pot 60 which operates (as heretofore set forth in connection with the dash-pot 47), to permit only a slow closing movement of the valve 57. This closing movement of the valve is sufficiently slow so that ordinarily the solenoid will again be energized by the repeated operation of the control bar 70 before the valve has closed. The valve 57 is thus kept open until the temperature of the glass in the boot is restored to normal, so that the suspended gobs once more prevent operation of the control bar and permit the valve 57 to close.

If the glass in the feeder becomes too hot, the rate of flow will be increased and the gobs G during their formation will draw downward to an abnormal length before severance. The lower end of the gob will thus engage the contact plate 74 and tilt the control lever 70 to the dotted line position (Fig. 8) so that the contact piece 76 will bridge the contacts 67, thereby closing the circuit for the electromagnet 43. The latter being thus energized, operates in the manner heretofore set forth to supply cooling air through the channel 35 for reducing the temperature of the glass. The valve plate 40 is maintained in its open position by the repeated excitations of the electro-magnet until the temperature of the glass is reduced to normal, closing of the valve plate 40 during this period being prevented by the action of the dash-pot 47.

It will be noted that the adjusting weight 77 on the control lever 70 permits the latter to be nicely balanced or adjusted so that the suspended glass need only contact with it very lightly to effect its operation. This contact is also only momentary or instantaneous, thus preventing any material chilling of the glass thereby. In the operation above described, the control is effected by the length or shape of the charge, rather than by its weight. The apparatus, however, may be so adjusted that the control is effected directly by the weight of the glass rather than its position or length. To effect such control, the weight 77 will be adjusted outward from the fulcrum 73, so that a substantial weight of glass on the contact plate 74 is required in order to tilt the lever 70. This method of control might obviously be applied to a feeder in which the glass is accumulated or supported before severance, in contrast to the method of forming and severing suspended charges, as particularly described in the present application. Thus, the contact plate 74 might operate as a husbanding device, support or container for the charge of glass prior to its severance, and might also be adjusted so that it will be tilted downward by the weight of the glass only when the weight is above normal, due to a too high temperature of the glass.

It is evident that the association of an apparatus of the character described with a feeder boot will assure a more uniform production of charges of glass being delivered to molds of a forming machine than is now possible and consequently will result in the production of uniform high grade ware, and minimization of the losses ordinarily resulting from irregularly formed ware. The fact that temperature change of the molten glass in the boot is effected by a highly sensitive apparatus automatically actuated by a very slight abnormal change in the length of a suspended charge of glass, or a variance in the weight of formed portions, further insures against production of ware lacking in uniformity to an objectionable degree.

If desired, an annunciator or signaling device may be employed to indicate to the operator an abnormal temperature condition. Such signaling device may be either supplemental to or used as a substitute for the solenoids or other automatic devices. As shown in Fig. 1, an electric bell 59ª is connected in the circuit in parallel with the solenoid 59 and will give a signal to the operator concurrently with the actuation of the solenoid when the temperature of the glass drops too low. A switch 591 in circuit with the bell and a switch 592 in the electro-magnet circuit, permit the use of both the bell and the electro-magnet at the same time, or either one alone, or, if desired, they may both be cut out of circuit, as, for example, when it may be desired to use the heat regulating mechanism only for preventing abnormally high temperatures. An annunciator or signaling device may in like manner be connected in circuit with the electro-magnet 43. As shown, an electric lamp 431 is employed. A signal lamp 593 may also be placed in the circuit in parallel with the electro-magnet 59 and bell 59ª, a switch 594 being placed in circuit with the lamp. The signal lamps 593 and 431 may be located in any convenient position and will preferably be of different colors, thereby indicating to the operator, the temperature condition of the glass.

While the foregoing description has been rather specific to the particular mechanism shown for changing the temperature of molten glass as it flows to the discharge outlet of a feeder boot, it is quite obvious that the issued portions of glass could well be employed to actuate the control mechanism by contact with the control bar 70 either before delivery to the forming machine or after the portions have been blown to their final form. Because of this fact and the probability of changes in certain details of construction, it is to be understood that I do not limit myself to the specific details disclosed.

What I claim is:

1. The combination of a container for molten glass having an outlet through which the glass issues, means for periodically severing the glass, and means operated by the issued glass before it is severed for regulating the temperature of the glass in the container.

2. The combination of a container for molten glass having an outlet opening in the bottom thereof through which the glass issues, means for controlling the issuing glass and causing it to be freely suspended from the walls of the outlet, means for periodically severing the suspended charges at a point beneath the outlet, and automatic means controlled by the length of the charge at the time of severance to regulate or control the length of succeeding charges.

3. The combination of a container for molten glass having an outlet opening in the bottom thereof through which the glass issues, means for controlling the issuing glass and causing it to be freely suspended from the walls of the outlet, means for periodically severing the suspended charges at a point beneath the outlet, and automatic means controlled by the length of the charge substantially at the time of severance to regulate or control the temperature of succeeding charges.

4. A glass feeder comprising, in combination, means for flowing and suspending charges of molten glass, means for periodically severing the charges, and automatic means controlled by the length of a charge substantially at the time of severance to control the length of succeeding charges, said automatic means including a control arm movable laterally into and out of the path of travel of charges of glass in synchronism with movements of the severing means.

5. A glass feeder comprising, in combination, means for flowing and suspending charges of molten glass, means for periodically severing the charges, automatic mechanism controlled by the abnormal length of a charge substantially at the time of severance to control the length of succeeding charges, and adjusting means for adapting said mechanism for use in control of the length of charges of different normal lengths.

6. A glass feeder comprising, in combination, means for flowing and suspending charges of molten glass, means for periodically severing the charges, automatic means controlled by the length of a charge substantially at the time of severance to control the length of succeeding charges, said automatic means including a pivoted control bar having a portion normally extending across the path of travel of severed charges and movable by abnormal charges to actuate said automatic means, and means for moving said portion out of said path of travel in advance of the period of severance of charges.

7. A glass feeder comprising, in combination, means for flowing and suspending charges of molten glass, means for periodically severing the charges, automatic means controlled by the length of a charge substantially at the time of severance to control the length of succeeding charges, said automatic means including a movable control bar extending across the path of travel of severed charges and moved by abnormal charges to actuate said automatic means, means for preventing movement of the control bar by the charges during the suspension of charges of normal length, and means for periodically moving said bar out of the path of travel of severed charges.

8. A glass feeder comprising, in combination, means for flowing and suspending charges of molten glass, means for periodically severing charges, automatic means controlled by the abnormal length of a charge substantially at the time of severance to control the length of succeeding charges, and means whereby said automatic means is maintained inactive during the suspension of charges of normal length.

9. In combination, a container for molten glass having a submerged discharge orifice, means for causing periodic suspension of formed charges from the walls of the orifice, means for severing said charges, individual mechanisms for increasing or decreasing fluidity of the glass within the container, and means actuated by suspended charges to cause operation of one of said mechanisms.

10. In combination, a container for molten glass having a submerged discharge orifice, means for causing periodic suspension of formed charges from the walls of the orifice, means for severing said charges, individual mechanisms for increasing or decreasing fluidity of the glass within the container, means actuated by suspended charges of abnormal length to cause operation of one of said mechanisms, and devices for positively rendering the last named means inactive during the suspension of charges of normal length.

11. In combination, a container for molten glass having a submerged discharge orifice, means for periodically suspending formed charges of glass from the walls of said orifice, means for severing said charges, a control bar movable laterally into and out of the path of travel of severed charges in synchronism with movements of the charge severing means, said control bar movable by suspension of charges of abnormal lengths, and means actuated by movement of said bar to control the length of succeeding charges.

12. In combination, a container for molten glass having a submerged discharge orifice, means for periodically suspending formed charges of glass from the walls of said orifice, means for severing said charges, a control bar movable laterally into and out of the path of travel of several charges in synchronism with movements of the charge severing means, said control bar movable by suspension of charges of abnormal lengths, individual mechanisms for increasing or decreasing the temperature and fluidity of glass within the container, and means whereby movement of said bar actuates one of the mechanisms.

13. In combination, a container for molten glass having a submerged discharge orifice, means for periodically suspending formed charges of glass from the walls of said orifice, means for severing said charges, a control bar movable laterally into and out of the path of travel of severed charges in synchronism with movements of the charge severing means, said control bar movable by suspension of charges of abnormal lengths, means actuated by movement of said bar to control the length of succeeding charges, and means including a continuously rotating cam for maintaining said bar in a neutral position during the formation of charges of normal length.

14. In combination, a container for molten glass having a submerged discharge orifice, means for periodically suspending charges of molten glass from the walls of said orifice, means for periodically severing the suspended charges, individual mechanisms for causing an increase or decrease of the temperature and fluidity of glass in the container and thereby controlling the length of issued charges, said mechanisms including valves, and means whereby one of said valves will be opened by suspension of a charge of abnormal length.

15. A glass feeder comprising in combination, means for flowing and suspending charges of molten glass, means for severing the charges periodically, individual mechanisms for applying cooling and heating mediums to the molten glass prior to its suspension in charge form, a control bar pivoted to the severing means, a portion of said control bar movable into and out of the path of travel of severed charges in synchronism with movements of the charge severing means, said control bar being adapted for rocking upon its pivot under influence of suspended charges of abnormal length, and means whereby movement of the control bar will cause application of the heating or cooling medium to the glass prior to its formation into charges and thereby control the length of succeeding charges.

16. A glass feeder comprising, in combination, means for flowing and suspending charges of molten glass, means for periodically severing the charges, automatic mechanism controlled by the abnormal length of a charge substantially at the time of severance to control the length of succeeding charges, said mechanism including a control bar, and a separable portion carried at one end of said bar and periodically movable out of the path of travel of several charges in advance of the period of severance of the charges.

17. A glass feeder comprising, in combination, means for flowing and suspending charges of molten glass, means for periodically severing the charges, automatic mechanism controlled by the abnormal length of a charge substantially at the time of severance to control the length of succeeding charges, said mechanism including a control bar, a separable portion carried at one end of said bar and periodically movable out of the path of travel of severed charges in advance of the period of severance of the charges, and means for adjusting said separable portion to permit said mechanism to control the length of different groups of charges of varying normal lengths.

18. A glass feeder comprising, in combination, means for flowing and suspending charges of molten glass, means for periodically severing the charges, automatic means controlled by the abnormal length of a charge of glass to control the length of succeeeding charges, said automatic means including a movable control bar extending across the path of travel of several charges, and means forming a connection between said control bar and the charge severing means for moving the bar out of the path of travel of severed charges in advance of severance of suspended charges.

19. A glass feeder comprising, in combination, a container for molten glass, means for periodically issuing and forming portions of molten glass, and automatic means actuated by the weight of a formed portion when the fluidity of the glass becomes excessive, to reduce the fluidity of glass in the container and control the weight of succeeding formed portions.

20. In a glass feeder, the combination of a container for molten glass having a discharge outlet, means for suspending charges from said outlet, means for periodically severing the charges, burners extending obliquely into the container from opposite sides thereof, and automatic means controlled by the length of a suspended charge to vary the effectiveness of the burners and control the length of succeeding charges.

21. In a glass feeder, the combination of a container for molten glass, means for issuing, suspending and severing charges of molten glass, a passageway extending transversely of the container, at least one wall of said passageway being formed by the side walls and floor of said container, and means automatically controlled by the length of suspended charges for circulating a cooling or heating medium through said passageway to vary the fluidity of the flowing glass in the container and control the length of succeeding charges.

22. The method of maintaining molten glass at a working temperature which consists in causing the glass to issue from an outlet in a container, freely suspending the issued glass, periodically severing the suspended masses of glass, and causing the glass while suspended to effect a control of the temperature of the glass in the container, dependent on a departure of the glass from a predetermined normal temperature and tending to restore the temperature to normal.

23. The method which consists in causing molten glass to issue from a supply body, causing the issued glass while united with the supply body, to position a controlling element, and regulating the application of a heat regulating medium to the glass by the position of said controlling element.

24. The method of maintaining uniformity in the volume of gathers of glass produced by an automatic glass feeder, which consists in causing a gather of glass as it issues from the feeder to regulate the amount of glass in a succeeding gather in response to a departure of the issuing gather from a predetermined normal volume.

25. The method of maintaining uniformity in the production of charges of glass which consists in causing the glass to issue from an outlet, suspending the glass from the outlet, periodically severing the charges, causing the suspended charges to operate to effect a regulation of the volumes of glass in succeeding charges, and determining said operation by the length of the suspended charge or charges at a predetermined instant prior to severance.

26. A glass feeder comprising, in combination, means for flowing and suspending charges of molten glass, means for periodically severing the charges, automatic means controlled by the weight of a charge substantially operable when the fluidity of the glass becomes excessive and at the time of severance to control weight of succeeding charges, said automatic means including a movable control arm normally disposed in the path of travel of severed charges to be moved by abnormal charges and cause actuation of said automatic means, and connection between the arm and severing means whereby actuation of the latter causes movement of the arm out of said path of travel.

27. A glass feeder comprising, in combination, means for flowing and suspending charges of molten glass, means for periodically severing the charges, automatic means controlled by the length of a charge substantially at the time of severance to control the length of succeeding charges, said automatic means including a control bar movable to actuate said automatic means, a vertically adjustable portion at one end of said bar normally disposed in the path of travel of severed charges, said bar being movable by charges of abnormal length, and means for periodically moving said adjustable portion out of said path of travel in advance of the period of severance of charges.

28. A glass feeder comprising, in combination, means for flowing and suspending charges of molten glass, means for periodically severing the charges, automatic means controlled by the length of a charge of glass to control the length of succeeding charges, a movable control bar for said automatic means normally extending across the path of travel of severed charges and moved by suspension of abnormal charges, means including an adjustable weight carried by said control bar to prevent movement of the bar during formation of normal charges, and means whereby movement of the severing means to a charge cutting position causes movement of the control bar out of the path of travel of severed charges.

29. In a glass feeder, the combination of a container for molten glass, means for periodically issuing and forming portions of molten glass, burners extending obliquely into the container from opposite sides thereof, and automatic means actuated by the weight of a formed portion to vary the effectiveness of the burners and thereby control the weight of succeeding formed portions.

30. In a glass feeder, the combination of a container for molten glass having a submerged discharge outlet, means for suspending charges from said outlet, means for periodically severing the charges, a passageway extending transversely of the side walls and bottom of the container, and means automatically controlled by the weight of a suspended charge for causing injection of a medium into said passageway to vary the fluidity of the glass in the container and control the weight of succeeding charges.

31. In glass forming apparatus, the combination of means for suspending charges of glass, means for severing the suspended charges, and mechanism actuated by the weight of a charge while suspended for controlling the weight of succeeding charges.

32. In glass forming apparatus, the combination of means for suspending charges of glass in succession, means for severing the suspended charges, and mechanism actuated by a charge while suspended for controlling the length of succeeding charges, said actuation being dependent on the length of the suspended charge.

33. In glass forming apparatus, the combination of means for suspending charges of glass, means for severing the suspended charges, and mechanism actuated by the weight of a charge while suspended for controlling the weight of succeeding charges, said mechanism including means preventing actuation of said mechanism during suspension of charges of normal weight.

34. The combination of means for discharging glass from a molten supply and seggregating it into individual masses, and means controlled by the glass and brought into activity by a departure of the glass from a predetermined normal temperature for effecting a return of the glass toward normal temperature and thereby automatically regulating its temperature, said means comprising a device in contact with the glass before said segregation and mechanically actuated thereby.

35. The combination of a container for molten glass having an outlet opening through which the glass issues, a controlling device under the influence of the issuing glass and mechanically operated thereby to a position determined by the rate at which the glass issues, and means controlled by said controlling device for changing the temperature of the glass in the container.

36. The combination of means for segregating charges of glass from a molten supply and delivering them to molds, and temperature regulating mechanism including a mechanical element in contact with and mechanically operated by the glass before the latter is separated from the supply body, said mechanism operable automatically upon a rise in temperature of the glass above a predetermined normal temperature and increase in the fluidity of the glass, to cause a return toward normal temperature.

37. The combination of means for segregating charges of glass from a molten supply and delivering them to molds, and automatic temperature regulating mechanism including a mechanical element mechanically operated by the glass before delivery to the molds, in response to variations when the fluidity of the glass becomes excessive, said mechanism being inactive while the glass remains in a predetermined normal condition of fluidity.

38. The combination of means for segregating charges of glass from a molten supply and delivering them to molds, temperature regulating mechanism responsive to variations in the fluidity of the glass including a controlling element mechanically actuated by a portion of the glass before delivery to a mold, and means under the influence of said controlling element for applying a temperature regulating medium to the glass in the container.

39. The combination of means for segregating charges of glass from a molten supply and delivering them to molds, temperature regulating mechanism responsive to variations in the fluidity of the glass including a controlling element in the path of the issuing glass and moved thereby to a position determined by the fluidity of the glass, and means controlled by said controlling element to apply a temperature regulating medium to the glass in the container.

40. The combination of a container for molten glass having a discharge outlet through which the glass issues, means for periodically severing the issued glass to produce mold charges, and means actuated by the issued glass prior to its severance to control the weight of succeeding charges of glass.

41. The combination of a container for molten glass having a discharge outlet through which the glass issues, means to periodically sever the issued glass and deliver it to molds, a controlling device actuated by the issued glass prior to its reception in a mold, and means under the influence of said controlling device for effecting a temperature control of the glass in the container.

42. The combination of a container for molten glass, means for causing a regulated discharge of glass therefrom, a temperature controlling device in the path of and actuated by the issuing glass, and means controlled by said device for automatically regulating the temperature of the glass in the container.

43. The combination of a container for molten glass, means for causing a regulated discharge of glass therefrom, a temperature controlling device in the path of the issuing glass and mechanically operated thereby, and automatic means to periodically withdraw said device from the path of the glass.

44. In apparatus for delivering molten glass, the combination of a glass container from which molten glass issues, a controlling device movable into the path of and mechanically actuated by the issuing glass, and electro-responsive means brought into activity by the actuation of said controlling device, for controlling the temperature of the glass within the container.

45. An apparatus for delivering charges of molten glass comprising a container from which the glass issues, temperature regulating means for regulating the temperature of the glass in the container, electro-responsive means for controlling said temperature regulating means, and a mechanical controlling device movable into the path of and mechanically operated by the issuing glass for effecting the operation of said electro-responsive means.

46. Apparatus for delivering charges of molten glass comprising a container from which the glass issues, means for separating the charges from the supply body of glass in the container, means for directing a flow of temperature regulating fluid, and automatic means controlled by the condition of the glass for regulating the flow of said fluid, said means comprising a mechanical element contacting with the glass before said separation and moved thereby to a position determined by the condition of the glass.

47. Apparatus for delivering charges of molten glass comprising a container from which the glass issues, means for causing and directing a flow of temperature regulating gases, electrically operated means for automatically regulating said flow of gases, and means contacting with and mechanically moved by the glass for controlling an electric circuit for said electrically operated means.

48. Apparatus for delivering charges of molten glass comprising a container from which the glass issues, means for causing and directing a flow of temperature regulating fluid, a valve controlling said flow, an electric motor for actuating the valve, and automatic means controlled by the condition of the glass for controlling the motor circuit.

49. The combination of a container for molten glass having an outlet through which the glass is discharged, means for causing and directing a flow of temperature regulating fluid by which the temperature of the glass in the container is regulated, a valve controlling said flow, a valve actuating device operable to move the valve quickly in one direction, and means to cause a slow return movement of the valve.

50. The combination of a container for molten glass having an outlet through which the glass is discharged, means for causing and directing a flow of temperature regulating fluid by which the temperature of the glass in the container is regulated, a valve controlling said flow, a valve actuating device operable to move the valve quickly in one direction, means controlled by the condition of the glass and brought into activity only during an abnormal temperature condition of the glass for causing the application of periodic impulses to said valve actuating device, and means to cause a slow return movement of the valve.

51. The combination of a container for molten glass, means for causing and directing a flow of temperature regulating medium by which the temperature of the glass in the container is regulated, a valve controlling said flow, an electro-magnet for operating the valve in one direction, means for returning the valve, retarding means by which a rapid return of the valve is prevented, and a controlling device under the influence of the glass and automatically operated periodically at short intervals while an abnormal temperature condition of the glass prevails, said controlling device being arranged to close the circuit for the electro-magnet at each operation of the controlling device.

52. The combination of a container for molten glass, means for causing and directing a flow of temperature regulating fluid by which the temperature of the glass is controlled, a valve controlling said flow, an electro-magnet operable when energized to open said valve, means to close said valve, a dash pot for retarding the closing movement of the valve, and means controlled by the condition of the glass for periodically closing the circuit of the electro-magnet at short intervals and thereby maintaining said valve open while an abnormal temperature condition of the glass prevails, said last mentioned means being inactive under normal temperature conditions of the glass.

53. The combination of a container for molten glass, a plurality of burners extending obliquely into the container from opposite side walls thereof, and automatic means controlled by the fluidity of the glass to vary the effectiveness of the burners.

54. The combination of a container for a supply body of molten glass, a plurality of burners extending obliquely into the container from opposite side walls thereof, a mechanical device in contact with a portion of the glass integral with the supply body and automatically moved by the glass to a position determined by the temperature and fluidity of the glass, and means controlled by said device for reducing the activity of the burners when the temperature of the glass rises above a predetermined degree.

55. The combination of a container for a supply body of molten glass, a plurality of burners extending obliquely into the container from opposite side walls thereof, a mechanical device in contact with a portion of the glass integral with the supply body and automatically moved by the glass to a position determined by the temperature and fluidity of the glass, and means controlled by said device for reducing the activity of the burners when the temperature of the glass rises above a predetermined degree and for increasing the activity of the burners when the temperature of the glass falls below a predetermined minimum degree.

56. The combination of means for segregating charges of glass from a molten supply, an implement contacting with and moved by the glass before said segregation, to positions determined by the fluidity of the glass, signaling devices, and automatic means controlled by said implement and operable when the temperature of the glass falls below normal to actuate one signaling device and when the temperature rises above normal to actuate another signaling device.

57. The combination of a container for molten glass having a bottom outlet through which the glass issues, means for controlling the flow and causing the glass to be suspended from the walls of the outlet, means for periodically severing the suspended charges of glass, a signaling device, and means actuated by the suspended glass and brought into activity by a departure of the glass from a predetermined normal condition, for operating the signaling device.

58. The combination of a container for molten glass having a bottom outlet through which the glass issues, means for controlling the flow and causing the glass to be suspended from the walls of the outlet, means for periodically severing the suspended charges of glass, signaling devices, and controlling means actuated by the suspended glass for causing the operation of one signaling device when the length of the suspended charge of glass is less than normal at the time of severance and for operating the other signaling device when the length of the charge of glass is greater than normal at the time of severance.

59. The combination of a container for molten glass having an outlet through which the glass issues, means for controlling the flow of glass, means for regulating the temperature of the glass in the container, a signaling device, and means actuated by the issuing glass for operating said signaling device and said temperature regulating means.

60. The combination of a container for molten glass having a discharge outlet through which the glass issues from the container at a rate variable with variations in the fluidity of the glass, means for periodically severing the issued glass at equal time intervals to produce individual mold charges of a size determined by the fluidity of the glass, means for applying to the glass in the container a temperature regulating medium, and controlling means actuated by the issued glass before severance for controlling said temperature regulating medium and thereby controlling the rate at which the glass issues and the size of the mold charges.

61. The combination of a container for molten glass having an outlet through which the glass is discharged, means for subjecting the glass within the container to the influence of a temperature regulating medium, and controlling means operated by the discharged glass before disconnection from the glass in the container, for controlling the operation of said temperature regulating medium.

62. Apparatus for delivering charges of molten glass comprising a container from which the glass issues, means for severing the issued glass to form individual charges, means for directing a flow of liquid or gaseous temperature regulating fluid comprising conduits through which said fluid flows, a valve controlling said flow, an electric motor for actuating the valve, and means automatically controlled by the condition of the glass for controlling the motor circuit.

63. Apparatus for delivering a succession of mold charges of molten glass comprising, in combination, a container for the glass having an outlet through which the glass issues, means for periodically severing the issued glass, a heating system arranged to supply heat to the glass before it issues from the container, a cooling system for extracting heat from the glass before it issues from the container, automatic means for bringing said heating system into activity when the temperature of the glass falls below a predetermined working temperature, and automatic means for bringing said cooling system into activity when the temperature of the glass rises above said working temperature.

64. In apparatus for delivering molten glass, the combination of a glass container from which molten glass issues, a controlling device movable into the path of and mechanically actuated by the issuing glass, and means brought into activity by the actuation of said controlling device, for controlling the temperature of the glass within the container.

65. A glass feeder comprising, in combination, a container for molten glass, means for periodically issuing and forming portions of molten glass, a movable contact piece beneath a said formed portion and moved automatically by the weight of said formed portion when the fluidity and weight of said formed portion are abnormal, and means operated and controlled by said movement to change the fluidity of glass in the container and control the weight of succeeding formed portions.

Signed at Toledo, in the county of Lucas and State of Ohio, this 4th day of June, 1926.

JOHN F. RULE.